United States Patent [19]

Gueli et al.

[11] Patent Number: 5,072,636
[45] Date of Patent: Dec. 17, 1991

[54] TOOL-CARRYING SLIDE FOR LATHES

[75] Inventors: Francesco Gueli, Borgofranco D'Ivrea; Mario Prandoni, Legnano, both of Italy

[73] Assignee: OCN-PPL S.p.A., Legnano, Italy

[21] Appl. No.: 489,501

[22] Filed: Mar. 7, 1990

[30] Foreign Application Priority Data

Mar. 16, 1989 [IT] Italy ............... 67186 A/89

[51] Int. Cl.⁵ ............................. B23B 21/00
[52] U.S. Cl. ....................... 83/132; 82/159; 82/141
[58] Field of Search ............. 82/132, 133, 121, 141, 82/159

[56] References Cited

U.S. PATENT DOCUMENTS

| | | | |
|---|---|---|---|
| 3,651,698 | 3/1972 | Riedrich et al. | 74/818 |
| 3,798,721 | 3/1974 | Schalles | 82/159 |
| 3,798,722 | 3/1974 | Lutz | 82/159 |
| 4,038,891 | 8/1977 | Zaninelli | 82/36 |
| 4,413,539 | 11/1983 | Ishizuka et al. | 82/159 |
| 4,669,359 | 6/1987 | Shiba | 82/141 |
| 4,785,513 | 11/1988 | Lee et al. | 82/159 |

FOREIGN PATENT DOCUMENTS 1552503 8/1973 Fed. Rep. of Germany.
1369145 10/1974 United Kingdom.

OTHER PUBLICATIONS

European Search Report on European Patent Application No. EP 90106961.7.

Primary Examiner—Frederick R. Schmidt
Assistant Examiner—Lawrence Cruz
Attorney, Agent, or Firm—Fish & Richardson

[57] ABSTRACT

The slide 14 carries a support 18 for a plurality of tools, which is secured to a sleeve 34 rotatable and axially slidable on a body 38. The slide 14 carries a series of hydrostatic bearings 36, 39 and 87 to guide rotatably the sleeve 34 and axially the body 38. The sleeve 34 is angularly tied to the body 38 through a normally closed front clutch 42, 43, which is opened by axially displacing the sleeve 34 with respect to the body 38, through a hydraulic device 44, 47. A reversible electric motor 52 is operated for rotating the sleeve 34 to select the tool, and may be numerically controlled for continuously displacing the tool during a working operation.

10 Claims, 2 Drawing Sheets 5,072,636

TOOL-CARRYING SLIDE FOR LATHES

BACKGROUND OF THE INVENTION

This invention relates to a tool carrying slide for lathes, adapted to move a working tool along the axis of the lathe, comprising a support for a plurality of tools.

There are known several kinds of supports, or turrets for a plurality of tools for the lathe. Therein, the selection of the tool requires one or more movements of the turret with respect to the slide, whereas during the working the turret must be rigidly connected to the same slide. A kind of turret is rotatable on the slide for selecting the tools, which are mounted therein in predetermined angular positions, radially on its lateral surface or axially on its front surface.

From the U.S. Pat. No. 4,038,891 a known turret of the above kind is normally angularly connected to the slide through a toothed front clutch. The turret is also connected by a screw-and-nut device to an intermediate body, which can be rotated to displace axially the turret for selecting the tool. The angular positions of the turret are defined by a series of grooves on the slide, cooperating with some pawls carried by the turret. A reversible electric motor coaxial with the turret causes at first the rotation of the intermediate body to open the front clutch and thereafter the trailing of the turret for selecting the new tool.

Finally, to close again the front clutch, the intermediate body must be rotated in opposite direction through a predetermined stroke, by reversing the rotation of the electric motor.

This turret is very intricate and expensive to manufacture. In addition it presents the disadvantage that the trailing of the turret by the intermediate body and the reversal of the motion of the intermediate body at the end of the selection cause dangerous shocks of the parts. Furthermore the turret, at the instant of the stop of the rotation, is subject to overcome the angular position, due to the momentum or to the possible unbalanced weight of the tools. Finally the positioning by means of groove and pawls does not allow any possible additional rotation of the turret with respect to the predetermined angular positions.

The technical problem that the invention intends to solve resides in providing a slide wherein the tool carrying rotatable support is of the maximum simplicity and reliability and wherein the above listed disadvantages are removed.

SUMMARY OF THE INVENTION

This technical problem is solved by a slide of the above type, adapted to move a working tool along the axis of the lathe, comprising a support for a plurality of tools, said support being secured to a sleeve rotatably mounted on a hollow body, a front clutch normally effective for angularly tying said sleeve to said hollow body, and motor operated control means for rotating said sleeve to select one of said tools for a working operation, wherein the improvement resides in providing displacing means operable irrespectively from said control means for relatively axially displacing said sleeve and said hollow body to render said clutch ineffective during the rotation of said sleeve.

In this way it is possible to control an additional rotation of the support with respect to the predetermined angular positions, both in the case it is required for adjusting the relative position of a tool with respect to the axis of the lathe, and in the case it is necessary to move the tool in a continuous manner during the working under the control of a numerical control apparatus, to obtain profiles or surfaces of specific shape on the workpiece.

A preferred embodiment of the invention is hereinafter described by way of example, with reference to the annexed drawings.

DESCRIPTION OF THE PREFERRED EMBODIMENT

Figure 1:
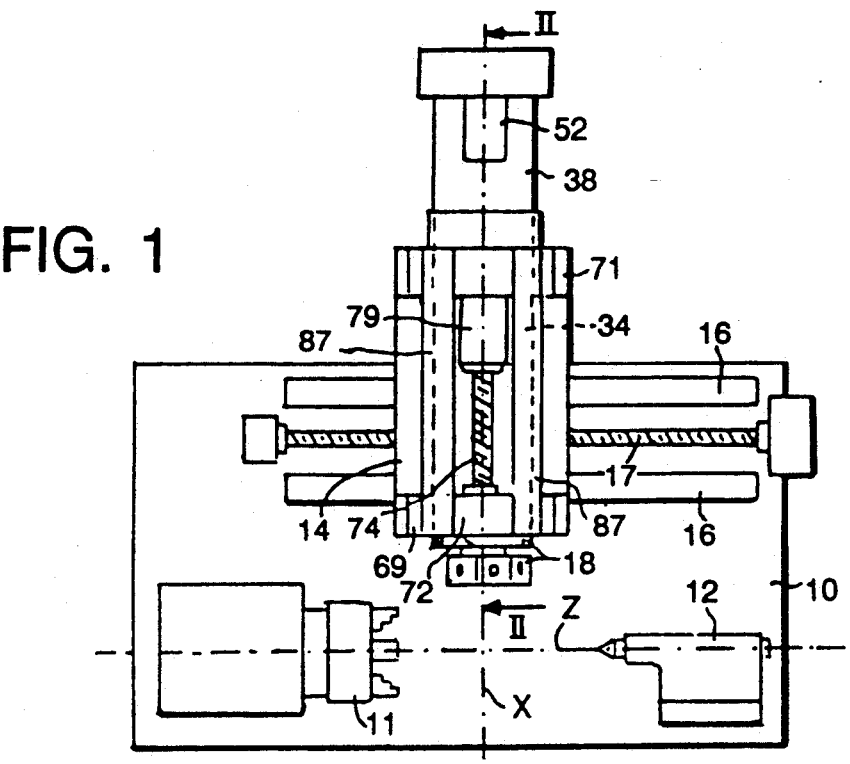
FIG. 1 is a diagrammatic plan view of a parallel lathe embodying a tool carrying slide according to the invention.

With reference to the FIG. 1, the numeral 10 indicates the frame of a parallel lathe, which mounts the conventional self centering rotatable chuck 11 and tailstock 12 for the workpiece, which define the axis Z of the lathe. Mounted on the frame 10 is also a tool carrying slide, generically indicated by 14, which is slidable on two rails 16, parallel to the axis Z. The slide 14 is displaced along the rails 16 in a known manner, for example through a screw-and-nut device 17 to provide the working motion of the tool along the axis Z.

Mounted on the slide 14 is a support for a plurality of tools, which is formed of a rotatable body 18, usually named turret plate. The turret plate 18 is adapted to be rotated on the slide 14 and to be moved along an axis co-planar and perpendicular to the axis Z, which forms the axis X of the tool motion.

The turret plate 18 (FIGS. 2 and 3) comprises a plate 19 secured to a hollow prismatic body 21 having a plurality of faces 22 for fixing the tools. Particularly in each face 22 a positioning seat 23 is provided for a toolcarrier 26 and for the relevant fixing means not shown. The prismatic body 21 has normally an odd number (seven in FIG. 3) of faces, so as to locate only one tool at a time on the work plane defined by the axes X and Z (FIG. 1).

Figure 2:
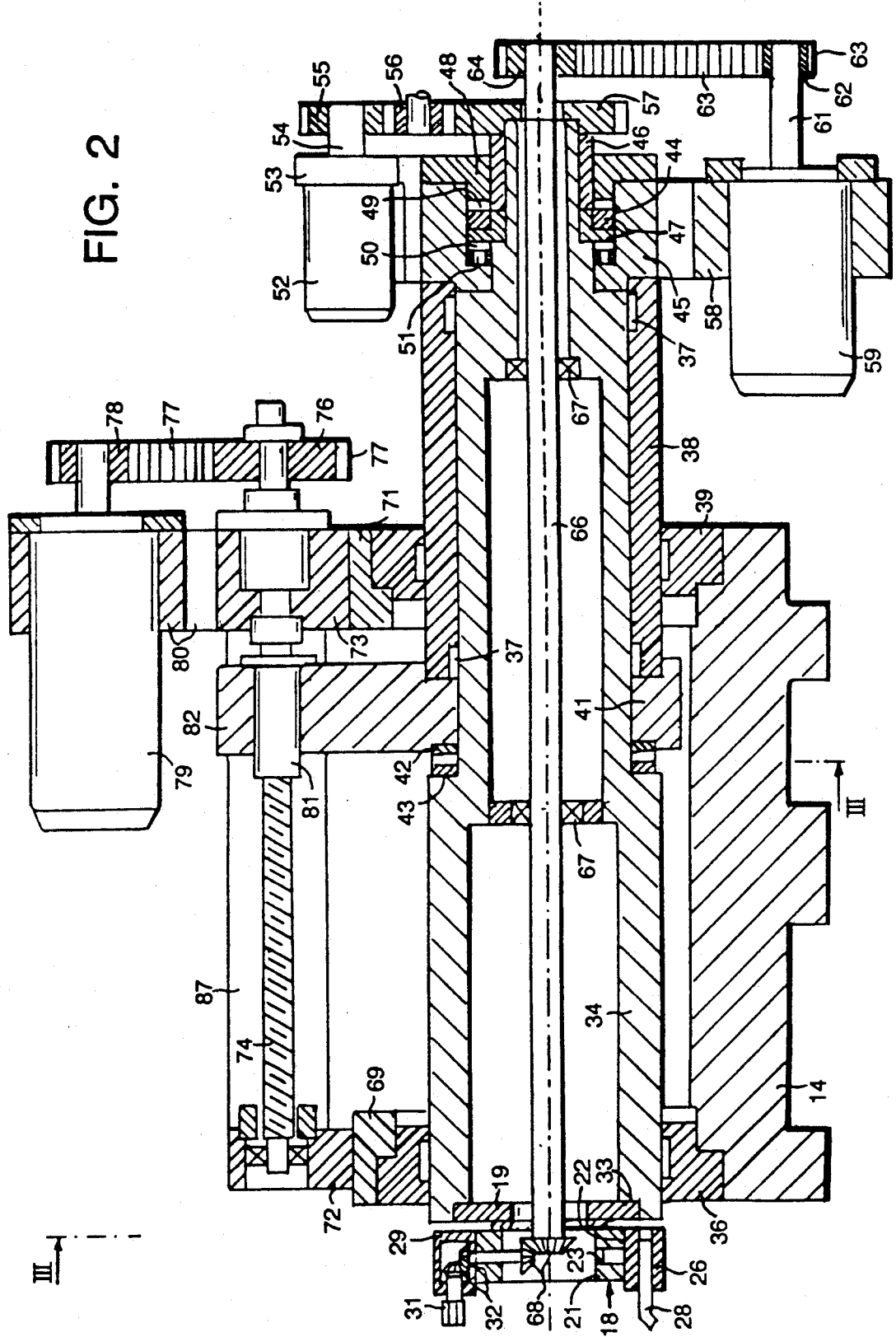
FIG. 2 is a sectional view of the slide according to the line II—II of FIG. 1, in an enlarged scale.

As it is known, for a modern lathe several toolcarriers 26 (FIGS. 2 and 3) are provided, which may have different shape to house different tools, but present standardized positioning and fixing means on the prismatic body 21, whereby the greatest flexibility is obtained in the use of the toolings. Each toolcarrier 26 is adapted to house in a removable manner a lathing tool 28 of axial type as indicated in FIG. 2, or of radial type.

On at least one face 22 of the body 21 a toolcarrier 29 can be mounted, which is adapted to house a tool 31 of rotatable type, for example a milling tool. The tool-carrier 29 comprises a series of gears 32 adapted to transmit the rotating working motion to the tool 31. The turret plate 18 is secured through the plate 19 into a seat 33 of a sleeve 34, which is mounted rotatably and slidably along its axis on a hydrostatic bearing 36 located on the forward part of the slide 14 (leftwards in FIG. 2).

The sleeve 34 is also rotatably mounted, through a pair of rolling bearings 37, into a cylindrical hollow body, formed of a second sleeve 38 coaxial with the sleeve 34. The sleeve 38 is in turn slidably mounted on the slide 14 through a second hydrostatic bearing 39 located on the rear part of the slide 14. The sleeve 38 is not rotatable on the bearing 39 being angularly tied to the slide 14, as it will be better seen hereinafter. Secured to the forward end of the sleeve 38 is a support plate 41, which is provided with a toothed front crown 42, for example a Hirth toothed crown. This crown 42 is normally in mesh with a similar toothed crown 43 located on a shoulder of the sleeve 34. Therefore the two toothed crowns 42 and 43 form a normally closed front clutch, which holds the sleeve 34 angularly tied to the sleeve 38.

The bearings 37 are adapted to allow a predetermined relative axial motion of the sleeve 34 with respect to the sleeve 38, in order to open the front clutch 42, 43. This axial motion is controlled by a fluodynamic device, comprising a hydraulic cylinder 44 obtained into a block 45 secured on the sleeve 38, and a hydraulic piston 47 secured on the sleeve 34 by means of a bush 46.

Secured to the block 45 is a flange 48 rearwardly closing a chamber 49 provided between the cylinder 44 and the piston 47. Opposite to the chamber 49 another chamber 50 is provided between the cylinder 44 and the piston 47. The two chambers 49 and 50 are adapted to receive the oil under pressure selectively through two corresponding ducts not shown in the drawings.

Normally, with the clutch 42, 43 closed, the chamber 50 is held under pressure. On the contrary, by supplying the oil under pressure into the chamber 49 the piston 47 is displaced leftwards, till stopping against a front rolling bearing 51 carried by the body 45. The piston 47 displaces thus the sleeve 34 leftwards, and opens the clutch 42, 43, whereby the sleeve 34 can rotate freely with respect to the sleeve 38.

The sleeve 34 is rotated by motor operated means independent from the hydraulic device 44, 47. In particular such means include a reversible brushless direct current electric motor 52 carried by the block 45. The rotor of the motor 52 is connected with a shaft 54 through a precision epicycloidal motion reducer 53. The shaft 54, through a series of precision gears 54, 55, 56, rotates the sleeve 34 with respect to the sleeve 38, when the front clutch 42, 43 is open. These gears are of the rectilinear teeth type and include a toothed wheel 55 secured to the shaft 54 and in mesh with an idle gear 56, which is in mesh with a second toothed wheel 57 in turn secured to the sleeve 34.

To select a new tool 28 or 31 for the working, the motor 52 is rotated when the sleeve 34 holds the turret plate 18 retracted from the working position. In this case the motor 52 is speedily rotate a number of revolutions corresponding to the angular position of the new tool 28 on the turret plate 18, whereby this latter can be positioned in one of the seven foreseen angular positions, i.e. it is rotated in an indexed way.

Furthermore the motor 52 may be rotated for moving the selected tool in a continuous manner during the working, when the sleeve 34 holds the selected tool in engagement with the workpiece, in order to provide a controlled working motion of the tool along the axis Y. This motion is particularly useful when it is desired to obtain with the lathe special profile, by combining the various motions of tool along the three axes X, Y and Z.

Mounted on a bracket 58 secured to the block 45 is a brushless direct current electric motor 59, the shaft 61 of which carries a toothed pulley 62. A belt 63 transmits the motion between the pulley 62 and a second toothed pulley 64, which is secured to a shaft 66 rotatable on a pair of bearings 67 mounted coaxially on the sleeve 34.

The shaft 66, through a pair of bevel gears 68, is adapted to rotate the tool 31 of the toolcarrier 29.

Figure 3:
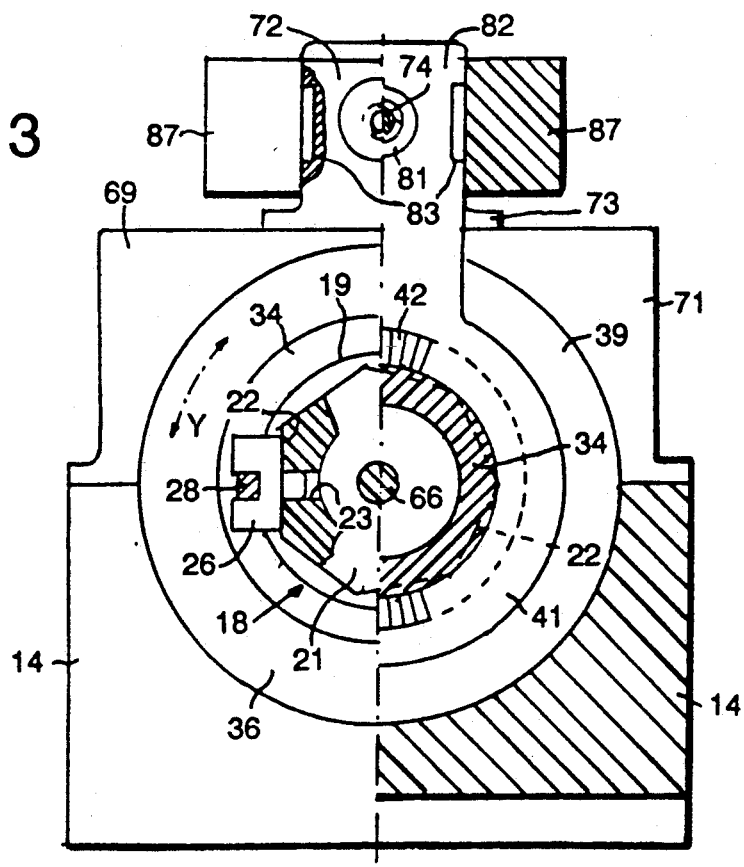
FIG. 3 is a sectional view according to the line III—III of FIG. 2.

Secured upwards to the two hydrostatic bearings 36 and 39 are two brackets 69 and 71, which are downwards secured to the slide 14 (see also FIG. 3). Secured to the two brackets 69 and 71 are two supports 72 and 73 (FIG. 2), which rotatably mount a screw 74. This latter is secured to a toothed pulley 76, which through a toothed belt 77 is rotated by a toothed pulley 78. This latter is secured to the shaft of another reversible brushless direct current electric motor 79, which is secured to a bracket 80 carried by the support 73. The screw 74 is engaged with a ball recirculating nut 81 secured to a upward prismatic projection 82 (FIG. 3) of the support plate 41. Therefore the screw-and-nut device 74, 81 is used for bodily displacing the two sleeves 34 and 38 along the axis X of the lathe.

The two lateral surfaces of the projection 82 are provided with two hydrostatic bearings 83, cooperating with the plane surfaces of two rectilinear guides 87, both secured to the supports 72 and 73. The two guides are arranged symmetrically with respect to the common plane where the axis of the sleeve 34 and the axis of the screw 74 lie (see FIG. 3). In this way the guides 87 prevent any rotation of the sleeve 38 with respect to the bearing 39, and therefore absorb the torsion produced by the sleeve 34 on the plate 41.

The lathe is controlled by a numeric control apparatus, adapted to rotate the motors 52 and 79, through position and velocity feedback logic circuits known per se, either by a point to point control, or by a continuous control.

The described slide operates as follows.

To select a new tool, the numeric control apparatus executes a corresponding program routine, which at first cause the motor 79 to rotate in such a direction that, through the belt 77, the screw 74 causes the nut 81 to translate together with the plate 41 and the two sleeves 34 and 38, toward the retracted position of FIG. 2.

Then the oil under pressure is supplied into the chamber 49, thus displacing the piston 47 leftwards, together with the sleeve 34, whereby the clutch 42, 43 opens. The toothed wheel 57 in this displacement follows the sleeve 34, but is not disengaged from the gear 56. Now the control apparatus causes the motor 52 to rotate, whereby the shaft 54, through the gears 55, 56 and 57, rotates the sleeve 38 till bringing the new tool 28 or 31 to the working position.

Finally the oil under pressure is supplied into the chamber 50, thus displacing the piston 47 rightwards, together with the sleeve 34, whereby the clutch 42, 43 closes again. As it is known, the two toothed crowns 42 and 43 of the Hirth type are such as to position the sleeve 34 angularly by mechanical way with maximum precision with respect to the sleeve 38.

The control apparatus now controls the rotation of the motor 79 in a direction opposite the previous one, so as to move the plate 41, together with the sleeves 34 and 38, along the axis X, thus bringing the selected tool to the working position. For this motion the plate 41 is supported through the hydrostatic bearings 83 and is guided by the surfaces of the guides 87, while the sleeves 34 and 38 slide on the hydrostatic bearings 36 and 39, whereby the motion along the axis X fully occurs on hydrostatic bearings.

If, during the working operation of a tool, a rotation of the sleeve 34 is required to obtain a motion of the tool along the axis Y, after having rotated the sleeve 34 for selecting the tool 28, 31, the control apparatus does not cause the clutch 42, 43 to close. The data of the working operation programmed for the axis X are then automatically corrected by the control apparatus by subtracting therefrom the stroke effected by the piston 47.

The control apparatus causes now the motor 52 to rotate so as to rotate, through the motion reducer 53 and the gears 55, 56 and 57, the sleeve 34 with a continuous motion in the direction foreseen by the program, thus generating a motion of the working tool along the axis Y, numerically controlled with position and velocity feedback. Simultaneously the control apparatus causes the screw-and-nut device 17 (FIG. 1) to operate under numeric control for displacing the slide, 14 along the axis Z. The angular position of the sleeve 34, as well the position of the tool along the axis Y, are therefore defined in this case exclusively by the shaft 54. At the end of the working operation, the control apparatus at first causes the motor 79 to operate for disengaging the tool from the workpiece. Then it causes the motor 79 to return the sleeve 34, and therefore the tool, to the starting zero position along the axis Y. Finally, the control apparatus, possibly after having caused the sleeve 34 for selecting another tool, causes the hydraulic device 44, 47 to operate for engaging again the clutch 42, 43, thus angularly tying the sleeve 34 to the sleeve 38.

From the above, it is clear that, by providing the axial displacing means 44, 47 for opening the front clutch 42, 43 separate from the rotating means 52-57 of the sleeve 34, the turret plate 18 can rotate both in a discontinuous or indexed way for selecting the tool, and in a continuous way for working on the lathe special profiles, for making bores out of the rotation axis, or for special milling operations, by combining the motion of the axes X, Y and/or Z.

Furthermore, it is clear that the slide 14 results very simplified with respect to the slides with conventional turrets, and that the disadvantages of the pawls of the conventional turrets are totally removed.

It is intended that various modifications and improvements can be made to the described slide without departing from the scope of the invention. For example the motion of the sleeves 34 and 38 along the axis X may be obtained by mounting the screw 74 on the plate 41 and the nut 81 on the slide 73, whereas the clutch 42, 43 may be operated by mechanical cam means, instead of the hydraulic device 44, 47.

We claim:

1. A machine tool-carrying slide, comprising:
   a slide member;
   a cylindrical hollow body axially and slidably mounted along said slide member;
   a sleeve coaxially and rotatably mounted to said cylindrical hollow body;
   a clutch, interconnecting said sleeve and said cylindrical hollow body, said clutch adapted to permit rotational motion of said sleeve regardless of axial motion of said sleeve and said cylindrical hollow body along said slide;
   a turret adapted to hold a plurality of tools, said turret mounted on said slide member, and said turret secured to said sleeve;
   said sleeve and said hollow body adapted for axially movement along said slide member between a working position and a retracted position,
   said slide member further comprising a motor, said motor comprising a reversible electric motor carried by said hollow body, said electric motor being controlled at the beginning of a working operation to rotate said sleeve to a preselected position corresponding to the tool to be selected for the next working operation, and being controlled during the working operation for continuously rotating said sleeve.

2. A machine tool-carrying slide according to claim 1, wherein said slide further comprises a hydraulic device adapted to control said clutch; said hydraulic device comprising a piston element and a cylinder element, a first of said piston element and said cylinder element secured to said hollow body, and the other of said piston element and said cylinder element secured to the sleeve.

3. A machine tool-carrying slide according to claim 1, wherein said slide further comprises hydrostatic bearings mounted upon said slide member, said hydrostatic bearings disposed between said slide member and said hollow body; and said slide further comprises rectilinear guides attached to said slide member, said hollow body being axially guided over said hydrostatic bearings by said rectilinear guides.

4. A machine tool-carrying slide according to claim 3, further comprising a prismatic projection secured to said hollow body, and a pair of said hydrostatic bearings provided on a pair of opposite faces of said projection to cooperate with a pair of said rectilinear guide surfaces of said slide.

5. A machine tool-carrying slide according to claim 4, further comprising a reversible electric motor controlling the axial displacement of said hollow body through a screw-and-nut device, the nut of said screw-and-nut device being secured to said prismatic projection at a predetermined distance from the axis of said hollow body, said prismatic projection adapted to translate motion of said screw-and-nut device into axial motion of said sleeve and said hollow body, whereby the torsion produced by the rotation of said sleeve is absorbed by said rectilinear guide surfaces.

6. A machine tool-carrying slide according to 1, 2, 3, 4, or to 5, wherein said sleeve is adapted for rotation on an axis co-planar with the axis of said machine tool, and wherein support for said tools is formed by said turret secured to said sleeve said turret having a plurality of seats for housing said tools.

7. A machine tool-carrying slide according to claim 6, wherein at least one of said seats is adapted to house a rotatable tool operable coaxial with said sleeve, said shaft being rotated by another motor carried by said hollow body.

8. A machine tool-carrying slide, comprising:
   a slide member slidable in parallel to a machine axis;
   a cylindrical hollow body axially and slidably mounted along said slide member;
   a sleeve coaxially and rotatably mounted into said hollow body;
   a turret adapted to hold a plurality of tools, said turret being secured to said sleeve;
   a front clutch normally effective for angularly interconnecting said sleeve and said hollow body;
   a reversible electric motor carried by said hollow body and operable for rotating said sleeve, said electric motor constantly engaging said sleeve through intermediate motion transmitting means;
   displacing means operable irrespectively from said electric motor for relatively axially displacing said sleeve and said hollow body to render said clutch ineffective; and control means for controlling the operation of said electric motor and said displacing means at the beginning of a working operation as to index said sleeve by rotation for selecting one of said tools for said working operation, said control means being also adapted for numerically controlling said electric motor to rotate said sleeve as to rotate said sleeve continuously during said working operation for altering the position of the selected tool during any part of said working operation.

9. A machine tool-carrying slide according to claim 8, wherein said sleeve is adapted for rotation on an axis co-planar with the axis of said machine, and wherein said turret is provided with a plurality of seats for housing said tools, at least one of said seats being adapted to house a rotatable tool adapted to be operated by a shaft coaxial with said sleeve, said shaft being rotated by a motor carried by said hollow body.

10. A machine tool-carrying slide according to claim 8 or 9, wherein said slide member is provided with another reversible electric motor for controlling the axial displacement of said hollow body through a screw-and-nut device, said hollow body having a prismatic projection distanced from the axis of said hollow body, said screw-and-nut device being mounted on said projection, a pair of opposite parallel faces of said projection being provided with an associated pair of hydrostatic bearings and being symmetrically located with respect to a plane where the axis of said hollow body and the axis of said screw-and-nut device lie, said slide member comprising a pair of parallel rectilinear guiding surfaces slidably cooperating with said hydrostatic bearings.

* * * * *